(12) United States Patent
Braatz

(10) Patent No.: US 7,549,793 B2
(45) Date of Patent: Jun. 23, 2009

(54) DEVICE FOR DRAINING OFF LIQUID DROPLETS FROM A TEMPERATURE SENSOR

(75) Inventor: Michael Braatz, Bad Vilbel (DE)

(73) Assignee: Atlas Material Testing Technology GmbH (DE)

( * ) Notice: Subject to any disclaimer, the term of this patent is extended or adjusted under 35 U.S.C. 154(b) by 9 days.

(21) Appl. No.: 11/943,131

(22) Filed: Nov. 20, 2007

(65) Prior Publication Data

US 2008/0117950 A1 May 22, 2008

(30) Foreign Application Priority Data

Nov. 20, 2006 (DE) .................. 20 2006 017 648 U

(51) Int. Cl.
*G01K 1/00* (2006.01)
*G01K 1/14* (2006.01)
*G01K 13/00* (2006.01)

(52) U.S. Cl. ...................................... 374/141; 374/208

(58) Field of Classification Search ................. 374/163, 374/141, 208
See application file for complete search history.

(56) References Cited

U.S. PATENT DOCUMENTS 6,765,278 B2 * 7/2004 Parsons ...................... 257/470
2008/0089383 A1 * 4/2008 Liu et al. ...................... 374/44

FOREIGN PATENT DOCUMENTS

| EP | 1 500 920 | 1/2005 |
| JP | 61-235054 | 10/1986 |
| JP | 11-248543 | 9/1999 |

* cited by examiner

*Primary Examiner*—Gail Verbitsky
*Assistant Examiner*—Mirellys Jagan
(74) *Attorney, Agent, or Firm*—Vedder Price P.C.

(57) ABSTRACT

A device for draining off liquid droplets from a temperature sensor, said device comprising a fixture for mounting a temperature sensor, a ledge arranged relative to the edge portion of the temperature sensor mountable in said fixture such that any liquid droplets at the edge portion are drawn into the interspace between the ledge and the edge portion.

8 Claims, 1 Drawing Sheet

DEVICE FOR DRAINING OFF LIQUID DROPLETS FROM A TEMPERATURE SENSOR

FIELD OF THE INVENTION

The present invention relates to a device for draining off liquid droplets from a temperature sensor, it also relating to a device for artificially weathering specimens with such a device.

BACKGROUND OF THE INVENTION

The object of devices for artificially weathering of material specimens is to estimate the useful life of materials which when put to use are permanently exposed to natural weather conditions and thus deteriorate under such climatic influencing effects as the light and heat of the sun, moisture and the like. For a good simulation of natural weather conditions the spectral energy distribution of the light generated in the device needs to correspond as best possible to that of natural sunlight, this being the reason why xenon radiators are employed as a rule in such devices as the sources of radiation. Accelerated aging-testing the materials is substantially achieved by irradiating the specimens much more intensively than under natural conditions, resulting in aging of the specimens being accelerated so that an indication as to the long-term aging response of a material specimen is obtained after a relatively short period of time.

Most of the specimens tested in artificial weathering apparatuses are made of polymer materials, the deterioration of which due to weathering is substantially caused by the UV component of solar radiation. The photochemical primary processes involved, in other words the absorption of photons and the generation of stimulated conditions or free radicals, are not a function of the temperature in a first approximation, whereas the subsequent steps in the reaction with the polymers or additives may depend on the temperature, so that the observed aging of the materials is likewise a function of the temperature. To what degree this temperature dependency holds depends on the material and the observed change in properties involved.

To take this into account, it is generally so that in artificially weathering of polymer materials room temperature and/or the specimen temperature is maintained constant. Maintaining constant and knowledge of the temperatures concerned is necessary because of aging being a function of temperature to permit comparing the results of the various weathering sequences to each other.

Since directly measuring the temperature of the material specimens being tested is problematic, temperature sensors are employed in weathering apparatuses, whose sensed temperature is a measure of the specimen temperature. For this purpose use is made, as a rule, of planar temperature sensors, particularly so-called black standard sensors, black panel sensors and white standard sensors. These are usually structured so that they comprise a metal plate having a lacquered surface facing the radiation source of the weathering apparatus during operation and a thermistor such as a platinum resistor on the reverse side of the metal plate. Within the weathering apparatus the temperature sensors are subjected to precisely the same conditions as the material specimens, i.e. they being particularly exposed to the radiation field of the radiation source and the remaining conditions set within the weathering chamber.

A distinction is made between so-called dynamic weathering apparatuses, in which the material specimens and the temperature sensors on a specimen mount are caused to rotate about a radiation source, and static weathering apparatuses in which the material specimens and the temperature sensors are maintained stationary.

In static weathering apparatuses such as, for example, the "Suntest" apparatus of the present assignee the material specimens and the described planar temperature sensors are mounted directly juxtaposed on a base plate of the apparatus within a weathering chamber of the weathering apparatus and exposed to the various weathering sequences of the weathering apparatus. These weathering sequences mostly involve, among other things, a rain phase in which the material specimens are sprayed with ultrapure water under controlled conditions. After the rain phase in which the temperature sensors are wetted with water these are required to resume their normal function as quickly as possible. This makes it necessary that the temperature sensors are relieved of water droplets as quickly and as thoroughly as possible. For this purpose the temperature sensors are arranged slightly inclined to the base plate of the weathering apparatus so that the water droplets can run off by the force of gravity. It has, however, been discovered that although the water droplets run to the bottom edge of the temperature sensor they fail to run across the edge and thus collect at the edge. When this happens, however, the temperature sensors are unable to fully function and it takes quite a long time before, for example, a black standard sensor has retained its wanted value in being fully functionable. If nothing is done, this delay lasts as long as the water droplets having collected at the edge need to evaporate. This, however, drags out the weathering sequences intolerably.

SUMMARY OF THE INVENTION

It is thus the object of the present invention to define a device with which liquid droplets can now be effectively drained off quickly. This object is achieved by the features of the independent claims. Advantageous aspects and further embodiments read from the sub-claims and the further independent claims.

The device in accordance with the invention as claimed in the independent claims provides for a ledge being arranged relative to the edge portion of a temperature sensor such that any liquid droplets, particularly water droplets at the edge portion are now drawn into the interspace between the ledge and the edge portion.

A first aspect of the device in accordance with the invention comprises a fixture for mounting a temperature sensor including a ledge as recited.

A second aspect of the device in accordance with the invention comprises a temperature sensor including the ledge as recited.

The spacing and position of the ledge relative to the edge portion of the temperature sensor are selected particularly so that a water droplet on the edge portion wets a portion of the ledge. This results in a capillary effect, causing the water droplet to be drawn by its full volume into the constriction between the ledge and the edge portion. It is in this way that the water droplets are removed from the edge portion of the temperature sensor so that the values as wanted for proper performance and functioning are now attained very quickly. In other words, the ledge and its arrangement relative to the edge portion of the temperature sensor now constitutes an effective drainage of the water.

The temperature sensor may be, for example, rectangular or square in shape with a planar surface. The edge portion can result from one of the four side edges of the rectangular or square. The ledge may then take on a linear shape oriented parallel to the side edges. The ledge can extend fully or practically fully along one side edge of the temperature sensor.

The ledge has, for example, a sheet-type configuration, particularly as a layer formed from a piece of sheet metal, arranged ramped to the surface of the temperature sensor and ending by its upper edge at an angle above the edge of the temperature sensor and then being downswept from there. Ramping the sheet-type configuration in this way enables the liquid droplets, after having passed through the constriction, to drain off downwards therefrom by the force of gravity.

As already commented, the device may be configured so that the temperature sensor is rectangular or square in shape and the ledge arranged along one of its side edges. Since the temperature sensor is installed in the weathering chamber slightly inclined from the horizontal plane of the base plate such that one of its side edges is at a lower level, the ledge is arranged parallel to this side edge, it being to this side edge that the water droplets run due to the force of gravity during a rain phase sequenced in the weathering apparatus and can then be drained off in the manner as described.

It may furthermore be provided for that a planar base such as a substrate plate mounts the temperature sensor, at the one end of which a ledge is formed particularly having the shape of an upswept piece of sheet metal. Before the temperature sensor is installed in the weathering apparatus it is first joined to the substrate plate in thus making available an embodiment in accordance with the first aspect of the device in accordance with the invention. This device is then inserted as a whole in the weathering apparatus.

As an alternative to this embodiment it may also be provided for that a ledge forming part of the invention as described above is arranged at a suitable location in a weathering apparatus so that when the temperature sensor is inserted in the weathering apparatus its bottom end comes to rest relative to the ledge in the manner as described.

The temperature sensor may be formed by a black panel sensor, a black standard sensor or a white standard sensor.

The invention relates furthermore to a device for artificially weathering specimens which contains a device in accordance with the invention for draining off liquid droplets from a temperature sensor.

BRIEF DESCRIPTION OF THE DRAWINGS

The invention will now be detailed by way of example aspects in conjunction with the drawing in which.

DETAILED DESCRIPTION OF THE PRESENT EMBODIMENTS

Figure 1:
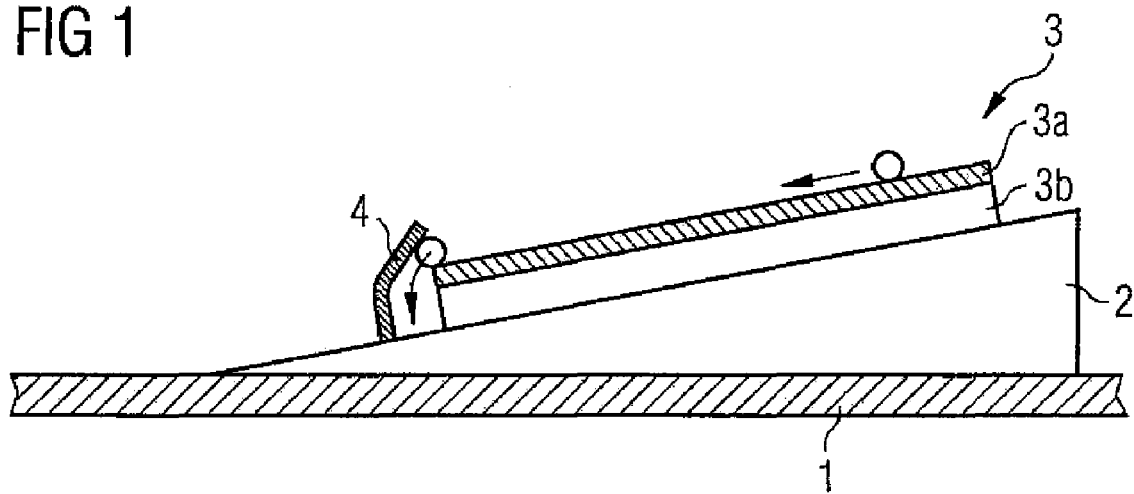
FIG. 1 is a diagrammatic side or cross-sectional view of a basic example aspect of the assembly in accordance with the invention.

Referring now to FIG. 1 there is illustrated by way of an example aspect the basic function of the device in accordance with the invention. The device in accordance with the invention is inserted within a weathering apparatus as shown in FIG. 1. The weathering apparatus comprises a base plate 1, part of which is shown in cross-section. Mounted on the base plate 1 on a portion provided therefore is a ramp 2 provided to mount a temperature sensor, for instance a black standard sensor 3 so that it is located inclined to the horizontal base plate 1. The black standard sensor 3 comprises a black lacquered plate 3a by ways and means known as such, mounted on a substrate 3b. In a top-down view the black standard sensor 3 is, for example, rectangular in shape, the long side of the black standard sensor 3 being evident from FIG. 1. The inclination of the upper side of the ramp 2 relative to the plane of the base plate 1 may be at an angle of 5°. Likewise arranged on the base plate 1 are the material specimens to be tested (not shown).

In the course of a rain phase provided in a weathering test in the weathering apparatus water droplets are also precipitated on the black standard sensor 3 or its black lacquered plate 3a which due to the force of gravity drain off in the direction of the bottom end because of the inclination of the black standard sensor 3 and as indicated by the arrows. Provided closely spaced away from the bottom end of the black standard sensor 3 is a ledge 4 extending along most of the length of the sensor. As soon as a water droplet, as shown, reaches the sensor it wets by its upper part the inner side of the ledge 4. Because of the capillary effect this results in the water droplet being drawn as a whole in the direction of the constriction between the ledge 4 and the bottom end of the black standard sensor 3. The principle involved is the same as that of water rising in a capillary caused by the surface tension of the water. As a result, the ledge 4 is fully drained from the bottom end of the black standard sensor 3 in a downflow along the ledge 4. In the example aspect as shown the ledge 4 is formed by a piece of sheet metal upswept from the ramp 2 and then downswept in the direction of the bottom end of the black standard sensor 3.

In the basic example aspect as shown in FIG. 1 the ledge 4 is directly mounted on the ramp 2.

Figure 2:
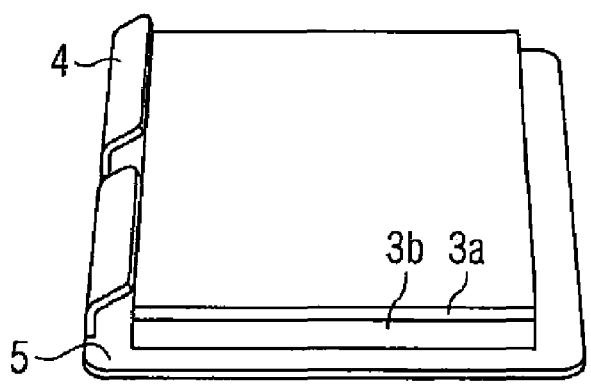
FIG. 2 is a view in perspective of a further example aspect of the assembly in accordance with the invention.
Figure 3:
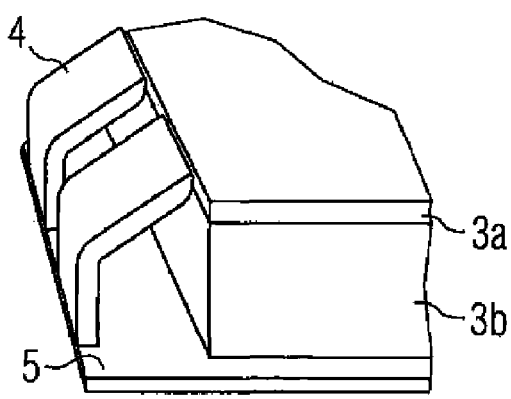
FIG. 3 is detail view in perspective of the further embodiment of the assembly in accordance with the invention.

Referring now to FIGS. 2 and 3 there is illustrated a practical example aspect of the assembly in accordance with the invention as a slanting top-down view in perspective (FIG. 2) and as a detail side view and somewhat further down (FIG. 3).

The practical example aspect as shown in FIGS. 2 and 3 too, features a ledge 4 in the form of a piece of sheet metal firstly being upswept vertically and then downswept in the direction of the bottom end of a black standard sensor 3. But in this practical example aspect the ledge 4 is secured to a substrate plate 5. In other words, the device in accordance with the invention can first be made available outside of the weathering apparatus by mounting the black standard sensor 3 on the substrate plate 5, before the device is then mounted in a weathering apparatus on the inclined upper side of a ramp 2, as is evident from FIG. 2.

The ledge 4 can extend along the full length of one side of the black lacquered plate 3a of the black standard sensor. But like the practical example aspect as shown in FIGS. 2 and 3 it can also be shaped in two parts with a port in the middle, for example, for porting electrical wiring to and from the black standard sensor 3. What is important is that most of the side length is juxtaposed by the ledge 4 to permit draining off as many water droplets as possible by the ways and means as described.

Experience with the device in accordance with the invention when used in standard weathering apparatuses shows that closed loop control of the irradiance which substantially depends on proper functioning of the temperature sensors can now be reinitiated much earlier on termination of the rain phase. The time interval until, for example, a black standard sensor retains the wanted values for proper functioning on termination of the rain phase is now shortened to roughly a third and thus the invention now makes it possible to shorten the overall duration of weathering tests involving rain phases.

What is claimed is:

1. A device for draining off liquid droplets from a temperature sensor, said device comprising:
   a temperature sensor, and
   a ledge spaced apart from an edge portion of the temperature sensor such that any liquid droplets at the edge portion are drawn into the interspace between the ledge and the edge portion, wherein the temperature sensor comprises a planar surface and the ledge takes the form of a sheet angled inclined to the surface of the temperature sensor.

2. A device for draining off liquid droplets from a temperature sensor, said device comprising:
   a fixture for mounting a temperature sensor,
   a ledge spaced apart from the edge portion of the temperature sensor mountable in said fixture such that any liquid droplets at the edge portion are drawn into the interspace between the ledge and the edge portion, wherein a substrate plate is provided as a fixture for mounting the temperature sensor, the ledge being secured to the substrate plate.

3. A device for draining off liquid droplets from a temperature sensor, said device comprising:
   a fixture for mounting a temperature sensor,
   a ledge spaced apart from the edge portion of the temperature sensor mountable in said fixture such that any liquid droplets at the edge portion are drawn into the interspace between the ledge and the edge portion,
   wherein the temperature sensor comprises a planar surface and the ledge takes the form of a sheet angled inclined to the surface of the temperature sensor.

4. A device for draining off liquid droplets from a temperature sensor, said device comprising:
   a temperature sensor, and
   a ledge spaced apart from an edge portion of the temperature sensor such that any liquid droplets at the edge portion are drawn into the interspace between the ledge and the edge portion, wherein a substrate plate is provided as a fixture for mounting the temperature sensor, the ledge being secured to the substrate plate.

5. An apparatus for artificially weathering specimens, comprising:
   a weathering device, and
   a device for draining off liquid droplets, comprising:
      a fixture for mounting a temperature sensor, and
      a ledge spaced apart from the edge portion of the temperature sensor mountable in said fixture such that any liquid droplets at the edge portion are drawn into the interspace between the ledge and the edge portion.

6. The apparatus as set forth in claim 5, further comprising a base plate for mounting the specimens to be weathered, and relative to the plane of the base plate a ramped surface for mounting the temperature sensor or a mounting fixture.

7. An apparatus for artificially weathering specimens, comprising:
   a weathering device, and
   a device for draining off liquid droplets, comprising:
      a temperature sensor, and
      a ledge spaced apart from the edge portion of the temperature sensor mountable in said fixture such that any liquid droplets at the edge portion are drawn into the interspace between the ledge and the edge portion.

8. The apparatus as set forth in claim 7, further comprising a base plate for mounting the specimens to be weathered, and relative to the plane of the base plate a ramped surface for mounting the temperature sensor or a mounting fixture.

* * * * *